United States Patent Office 3,725,264
Patented Apr. 3, 1973

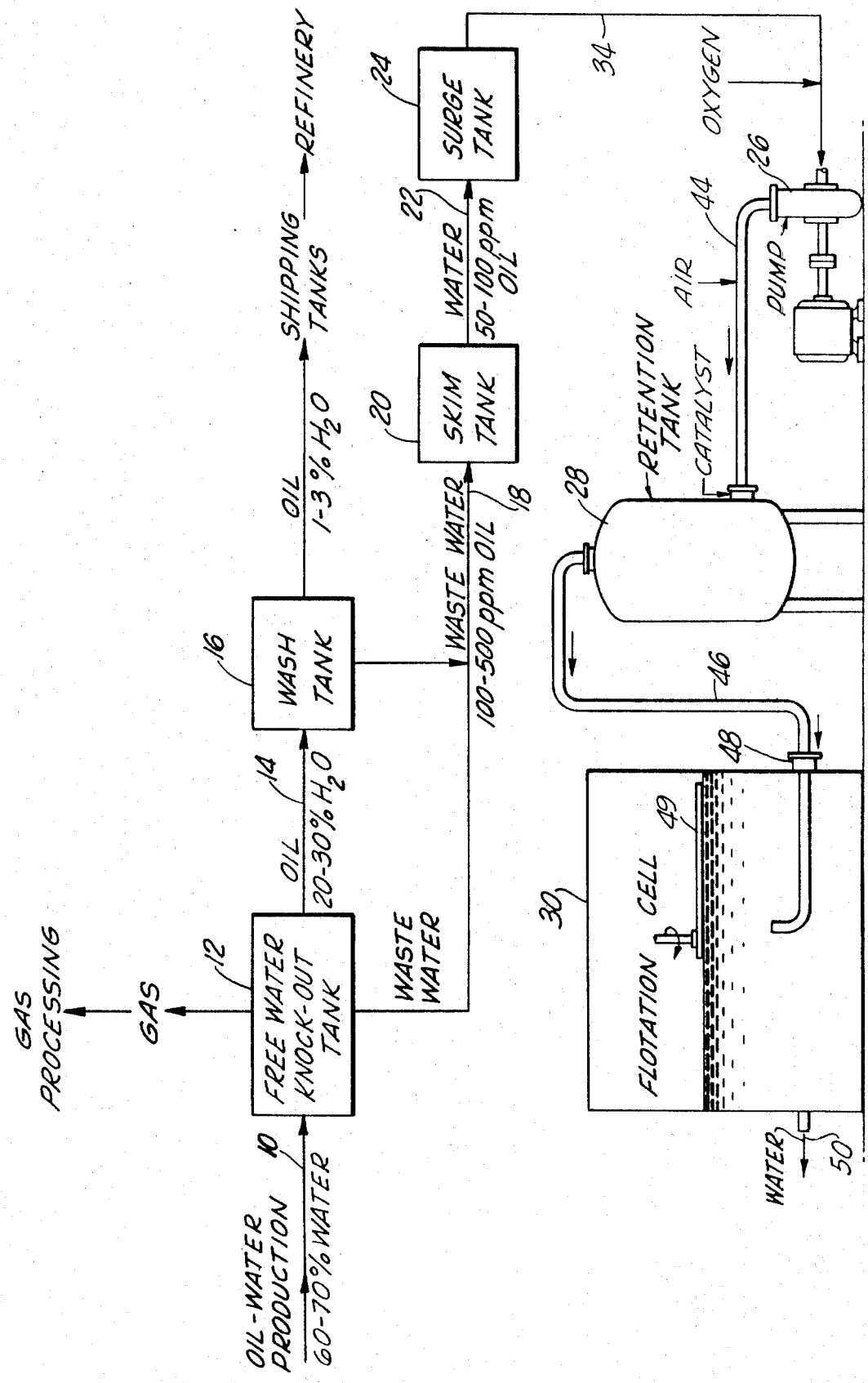

3,725,264
WASTE WATER TREATMENT PROCESS
Douglas W. Wheeler, Huntington Beach, Calif., assignor to Signal Oil and Gas Company
Filed Mar. 13, 1972, Ser. No. 234,276
Int. Cl. C02b 1/34
U.S. Cl. 210—44     10 Claims

ABSTRACT OF THE DISCLOSURE

A method for removing residual oil and dissolved sulfides from oil production waste waters prior to disposal of the waste water into the ocean, by the injection of controlled amounts of oxygen, air, and a catalyst to oxidize the sulfides to free sulfur into the waste water. The mixture is pumped under pressure into a flotation cell or tank where the pressure is released and the sulfur and oil are separated from the water by flotation.

BACKGROUND OF THE INVENTION

Large volumes of water are used in the oil industry in both refinery operations and crude oil production. After such use, the water is either discharged into the ocean or reused, but prior to disposal or reuse, this "used" or waste water must be treated to remove certain undesirable substances.

Primary oil production produces crude oil with as much as 20 to 50% water. In water flooding operations, commonly used as a secondary recovery method for oil production, oil is produced by injecting water into an oil bearing sand to push the oil and water in the sand formation towards adjacent wells where it is pumped to the surface. The oil thus produced is an oil-water mixture containing about 60 to 70% water. The oil in such production mixtures is normally separated from the water by physical separation means, such as settling tanks. The water from which the oil in the mixture is separated, still contains on the order of 50 to 500 p.p.m. oil and must be subjected to further clean-up operations to remove such residual oil therefrom prior to discharge into adjacent bodies of water. The discharge of this waste water into the ocean is regulated by governmental water quality control agencies which establish quality requirements for the waste water discharged into the ocean in order to protect the beneficial uses of the ocean. The State of California, for example, prohibits discharge of such waste waters into the Pacific Ocean unless such water contains less than 20 p.p.m. oil and grease.

The waste water clean-up operation employed conventionally is a flotation process by which gas is injected into the water and the mixture pressurized by pumping the oil-water mixture from a surge tank into a flotation cell where the pressure is released, so that gas bubbles through the water and attaches to the suspended oil globules or particles which reduces the effective specific gravity of the particles and causes the oil to move upward where it can be skimmed off in the flotation cell.

Another requirement for waste water discharge into the ocean, is a limitation of the amount of dissolved sulfide, which is usually present as hydrogen sulfide either un-ionized or ionized depending upon the pH of the water. The federal Environmental Protective Agency currently requires that water discharged into the ocean, contains less than 0.5 p.p.m. of ionized/dissolved sulfide.

Hydrogen sulfide has been removed from water by several methods, e.g. air or gas stripping, chlorination, precipitation and air oxidation. Gas or air stripping physically removes the hydrogen sulfide from the water and transfers it to the off-gas and ultimately to the atmosphere, which is objectionable from an air pollution standpoint. The stripping process also tends to raise the pH of the waste water which increases the scaling tendency of the water. The removal of hydrogen sulfide by chlorination is applicable from a practical stand point, only to waters of low sulfide content. Where the amount of hydrogen sulfide to be removed is substantial, the cost of the chlorine gas becomes excessive. Precipitation methods, for example, with zinc chloride, are also limited to waste waters having relatively small sulfide content due to high treating costs. Air oxidation processes for removing hydrogen sulfide from waste waters on an economically feasible basis, require an alkaline solution, since air oxidation of hydrogen sulfide in neutral or acidic waste waters is normally too slow to be economically feasible.

An air oxidation process for purifying secondary recovery waste waters using a soluble nickel catalyst is disclosed in U.S. Pat. No. 3,576,738 to John Duffy. The process described in the Duffy patent has been found satisfactory for treatment of waste water of moderate sulfide content, that is, below about 40 parts per million, however, when the sulfide content is above about 40 p.p.m. sulfide, the Duffy process was found to be inadequate for reducing the sulfide content of waste waters to acceptable levels, even with higher catalyst amounts.

It is therefore an object of my present invention to provide an improved process for removing hydrogen sulfide in relatively high concentrations, and residual oil particles, from waste waters preparatory to reuse or disposition of the waste waters.

It is also an object of my present invention to provide an improved waste water sulfide and residual oil removal process wherein a sufficient amount of oxygen is dissolved in the waste water during processing to facilitate removal of relatively high concentrations of sulfide to acceptable levels.

These and other objects of my invention will become apparent from the following description of my invention and from the appended claims and drawings.

SUMMARY OF THE INVENTION

It is proposed by my present invention to remove sulfide in a flotation waste water clean-up process by injecting an oxygen enriched gas into the waste water which with an oxidation catalyst effects rapid oxidation of the hydrogen sulfide. Air is also added to the waste water during processing, to facilitate removal of the sulfur, residual oil, and solid particles in a flotation cell separation. It has been discovered that in addition to effecting an efficient sulfide separation, my present process enhances solids removal effected in the flotation cell without employing additional chemicals, e.g., reverse emulsion breakers, emulsion breakers, or polyelectrolytes.

BRIEF DESCRIPTION OF DRAWINGS

The drawing shows schematically the present method for separating water from a produced oil and water mixture prior to disposal.

DETAILED DESCRIPTION OF INVENTION

With reference to the embodiment of my invention shown in the drawing, oil production from water flooding operation is produced from a well (not shown) and pumped through line 10 to settling tank 12, commonly called a settling or free water knock-out tank. In the settling tank 12, the gas products are released and sent to gas processing operations and the oil, with approximately 20 to 30% water therein, is transmitted through line 14 to a heated wash tank 16. In tank 16 the partially dewatered oil is heated and the oil-water mixture separated by settling. The water content of the separated oil is reduced to about 1 to 3%. Wash tanks such as tank 16, or "heater treaters" as gas fired tanks are sometimes called, contain means for heating the oil-water mixture to about 100° to 210° F. depending upon the type of crude oil being separated. For example, an 18 gravity crude oil is heated to about 140° F. but generally heavier crudes are heated to higher temperatures.

The oil separated in wash tank 16, is pumped to shipping tanks or a pipeline for transporting to storage or refinery processing. The waste water removed in the settling tank 12 is combined with the separated waste water from wash tank 16 in line 18 and additional oil removed therefrom in skim tank 20. The skimmed water withdrawn from skim tank 20 still has approximately 50 to 100 p.p.m. residual oil which must be removed prior to discharging into the ocean. This water is passed through line 22 to a container vessel or surge tank 24 from which it is pumped by pump 26 into retention tank 28 from which it is introduced into flotation cell 30. Each of the processing and apparatus items heretofore described are conventional and well known oil-water separation techniques. In accordance with the present process, oxygen is injected into the waste water at the suction side of the pump 26 to effect a rapid dissolution of oxygen into the pressurized waste water.

It was found that when waste waters with more than about 40 p.p.m. of sulfide are treated, the oxygen requirements increased and when air is used as the oxidizing gas it becomes necessary to inject so much air into the waste water in order to satisfy the oxygen requirements, that the excess air creates turbulence which reduces the efficiency of the flotation cell. Also, the use of air rather than oxygen, necessitates the use of a larger retention tank at higher sulfide concentrations, in order to allow the additional retention time needed to get oxygen (from the air) sufficient to oxidize the sulfide, into solution. A waste water treating process using air rather than oxygen is also less efficient since air injection causes more nitrogen than oxygen to be dissolved in the waste water.

Another important feature of my present invention is the addition of oxygen to the waste water prior to the injection of air into the waste water. This sequence causes the oxygen to go into solution before nitrogen is dissolved in the waste water. The oxidation of sulfides in the waste water is enhanced by the use of higher oxygen concentrations in solution per unit volume of gas added to the waste water, and as previously stated, this higher oxygen concentration is accomplished by the injection of oxygen into the waste water prior to the introduction of air. When oxygen is introduced into the waste water in relatively pure form for oxidation purposes, dissolved air is still needed in order to accomplish a good separation of solids and oil in the flotation cell. The use of air alone, however, when treating water of higher sulfide concentrations with larger amounts of air, results in flotation cell turbulence. Additionally, since air is only about one-fifth oxygen, a larger retention tank is needed when air is used in order to provide the additional retention time necessary to get the air into solution for oxidizing the sulfide. Air is needed in the flotation cell, since the flotation cell separation is accomplished by the release of dissolved air which effectively floats sulfur, oil particles, and solids to the surface in the flotation cell where these materials may be skimmed off.

Accordingly, in my present invention, it is important that the oxygen be added to the waste water before the air is added in order to facilitate solution of the oxygen, and preferably the oxygen is added to the waste water at the suction side of the pump and the air is added to the waste water at the discharge end of the pump. The pressurization of the waste water by the pump aids in dissolving the oxygen and also provides better mixing which further helps dissolve the oxygen in the waste water.

It has been found that when oxygen is added to the discharge end of the pump, oxygen dissolves less efficiently and therefore a larger retention tank is required than when oxygen is added to the suction side of the pump.

The catalyst is preferably added to the waste water after the injection of oxygen and air to avoid absorption of the catalyst by the oil, but not so soon as to initiate the reaction substantially upstream from the retention tank which would result in the formation of elemental sulfur which would clog the pipe between the pump and the retention tank. If the catalyst is absorbed by the oil, the sulfide removal will be reduced significantly. It has been found advantageous to add the oxidation catalyst to the waste water at the retention tank, since the catalyst is effective to initiate the reaction which almost immediately results in a substantial amount of sulfur precipitating in small colloidal particles. These particles would tend to deposit on the pipe wall between the pump and the retention tank or on the internal surfaces of the pump should the catalyst be added to the pump discharge or suction respectively.

The aerated waste water is pumped into the retention tank 28 from line 34 and under the pump pressure, flows through line 46 into the flotation cell 30 through back pressure valve 48 which is positioned at the flotation cell entry. The flotation cell 30 is maintained at atmospheric pressure, and as the waste water which is saturated with gas under pressure enters the flotation cell, the reduction in pressure causes the gas to be released from solution in the form of small bubbles which attach to oil particles, free sulfur, and residual solids and carry them to the surface of the water in the flotation cell. The materials may then be removed from the water surface by mechanical skimming means e.g. a rotary skimming arm 49. Clean waste water is removed from the flotation cell through line 50.

The type and the amount of catalyst is substantially the same as disclosed in the Duffy patent U.S. 3,576,738, i.e. about 0.1 p.p.m. to 1.0 p.p.m. nickel. The catalyst added to the waste water to effect oxidation of the sulfide, may be any effective water soluble compound, preferably a nickel compound such as, nickel sulfate, nickel acetate, nickel chloride, nickel sulfamate, nickel nitrate, chelated nickel, etc. The amount of nickel is limited both by economics and by the fact that excess amounts of nickel may discolor the water by the formation of excess amounts of black nickel sulfide. The nickel may be added in an amount from about 0.1 p.p.m. to the limit of solubility of the nickel sulfide in the waste water. Generally, the nickel is added in an amount of about 0.1 p.p.m. to 1.0 p.p.m., with the preferred range about 0.4 p.p.m. to 0.7 p.p.m. In the preferred catalyst concentration range it was found that the reaction time was about two minutes. At the increased concentrations of the nickel catalyst, the reaction time may be reduced, however, as above indicated, increasing the catalyst concentration is normally undesirable due to prohibitive costs and the increased tendency to form the black nickel sulfide.

The temperature at which the sulfide may be removed in the flotation cell, is not critical, however the temperature of about 50° to 150° F. is preferable. The temperature of the flotation operation is determined by the temperature of the waste water from the wash tanks (via skim tank 20). Although it is believed that increased temperatures would be desirable, heating within the flotation cell is believed to be impractical, with presently available equipment.

The sulfide removal operation may be accomplished at pressures from atmospheric to super-atmospheric, that is on the order of 100 p.s.i. The pressure on the waste water effects the amount of air going into solution and its maximum is limited by the pressure capacity of the retention tank. The preferred pressure range, that is, the pressure imposed upon the waste water prior to its entry into the flotation cell, is about 20 to 50 p.s.i.g.

The amount of oxygen added to the waste water for sulfide removal and flotation should be at least the amount stoichiometrically necessary for the reduction of the sulfide in the water to about 0.5 p.p.m. sulfide, which is at least about 0.5 s.c.f.m. per 10,000 barrels of waste water, or about 10–12 p.p.m. oxygen. The upper limit is not critical but rather a matter of economics. Lesser oxygen amounts require more catalyst or more air which if excessive could result in turbulence or a removal of the dissolved hydrogen sulfide by stripping, which puts noxious hydrogen sulfide gas into the atmosphere. The desired air treatment has been found to be about 1.0 s.c.f.m. per 10,000 barrels of waste water.

The following examples are given to illustrate the effectiveness of my invention and are merely illustrative and should not be construed as limiting the scope of my invention.

EXAMPLE I

In the treating system shown in the drawing, the waste water from the surge tank contained 55 p.p.m. dissolved sulfide and 20 p.p.m. oil. This waste water was treated by injection of about 0.5 s.c.f.m. oxygen per 10,000 barrels of waste water, injected on the suction side of the pump and about 1.0 s.c.f.m. air per 10,000 barrels of waste water injected on the discharge side of the pump. The catalyst addition was about 0.08 pound per day (as nickel) which is equivalent to 0.24 p.p.m. Nickel was added as nickel sulfate hexahydrate. The retention time in the retention tank which is an average of retention time of the water moving through the tank, was about 2.8 minutes. The water recovered from the flotation cell contained less than .1 p.p.m. sulfide and about 10 p.p.m. oil. In the run comparable to the one described above where the air was injected into the waste water ahead of the oxygen, the sulfide reduction was about 55 p.p.m. to about 5 p.p.m. This reduction was not acceptable to the Environmental Protection Agency which requires sulfide content of less than 0.5 p.p.m.

EXAMPLE II

In a system (FC#1) similar to that shown in the drawing, 18,200 barrels per day of waste water were pumped into a 35 barrel retention tank at a pressure of 42 p.s.i.g. The retention time was about 2.8 minutes of the retention tank. The catalyst was injected into the waste water on the suction side of the pump as nickel sulfate hexahydrate. The sulfide and oil removal data are tabularized in Table I.

TABLE I

| Into retention tank S=(p.p.m.) | Out retention tank S=(p.p.m.) | Out float cell S=(p.p.m.) | Injected at pump suction (s.c.f.m.) | Injected ahead of retention tank (pump DSCH) (s.c.f.m.) | Pressure (p.s.i.g.) | Ni++ (p.p.m.) |
|---|---|---|---|---|---|---|
| 65 | 1.0 | <0.5 | 1.0 | 1.2 | 42 | .7 |
| 65 | 3.0 | 1.5 | 0.5 | 2.0 | 42 | .7 |
| 65 | 1.0 | <0.5 | 0.5 | 2.0 | 50 | .7 |
| 65 | <0.5 | <0.5 | 1.0 | 1.0 | 50 | .7 |
| 65 | 1.0 | <0.5 | 1.0 | 1.0 | 42 | .35 |
| 65 | <0.5 | <0.5 | 1.0 | 1.5 | 42 | .35 |

EXAMPLE III

In another treating system (FC#5) similar to that shown in the drawing, 83,000 barrels per day of waste water containing 55 p.p.m. dissolved sulfide was treated in a retention tank. The retention time was about 3.4 minutes. A one pound per gallon solution of nickel was added at the rate of about 50 g.p.d. The temperature in the tank was 142° F. at a pressure of 42 p.s.i.g.

Data from this system is recorded in Table II. $S_1$ is a silicate flocculant and J-90 is a reverse emulsion breaker. As can be seen from these data, the use of oxygen rather than air in the treatment of this relatively high sulfide content (55 p.p.m.) waste water, is essential to reduce the sulfide content to EPA standards.

TABLE II

| Time | Percent oil removal | Oil (p.p.m.) flocculant cell in | Oil (p.p.m.) flocculant cell out | Sulfide (retention tank) in | Sulfide (retention tank) out | Sulfide flocculant cell out | Oxygen s.c.f.m. (rotometer) rate | Air s.c.f.m. (rotometer) rate | Ni++, p.p.m. | $S_1$, g.p.d. | J-90 g.p.d. |
|---|---|---|---|---|---|---|---|---|---|---|---|
| 0845 | 84 | 30 | 5 | 55 | 1.5 | 1.0 | 8 | +12 | 0.4 | 150 | 26 |
| 0915 | 84 | 30 | 5 | 55 | 1.5 | 1.0 | 8 | +12 | 0.4 | Off | Off |
| 1100 | 64 | 25 | 9 | 55 | 1.5 | 0.5 | 8 | +12 | 0.405 | Off | Off |
| 1215 | 67 | 27 | 9 | 55 | 1.5 | 0.4 | 8 | 12 | 0.405 | Off | Off |
| 1230 | | | | | | | | | Off | | |
| 1410 | 60 | 20 | 8 | 55 | 8 | 9 | 8 | 12 | Off | Off | Off |
| 1430 | 53 | 19 | 9 | 55 | 8 | 10 | 8 | 12 | Off | Off | Off |
| 1445 | | | | | | | | | | | |
| 1530 | 59 | 17 | 7 | 55 | 50 | 50 | Off | 10 | Off | Off | Off |
| 1600 | 50 | 18 | 9 | 55 | 50 | 50 | Off | 11 | Off | Off | Off |
| 22 days later (80,000 b.p.d.) | | | | 55 | 22 | 22 | Off | [1] 10 | 0.4 | Off | 26 |

[1] Air was injected into pump discharge also, at 34 s.c.f.m.

While my invention has been described above with reference to specific embodiments with a certain degree of particularity for illustration purposes, my inventions should not be limited thereby, but rather, should be afforded the full scope of the claims.

What is claimed is:

1. A process for removing residual oil and dissolved sulfide from waste water comprising the steps:
   (a) pumping said waste water from a container vessel thereby pressurizing said water,
   (b) injecting a gas consisting essentially of oxygen into said waste water at the suction side of said pump,
   (c) injecting air into said water subsequent to said oxygen injection,
   (d) introducing a water soluble nickel compound into said water under said pressure to effect catalytic air oxidation of said sulfide to sulfur,
   (e) subsequently introducing said pressurized water into a flotation cell maintained at a pressure less than the pressure to which said water was subjected by said pumping, to thereby release the pressure on said water and permit said air to bubble through said water to effect separation of said oil and said sulfur formed in said oxidation, and
   (f) removing said oil and sulfur at the surface of said liquid in said flotation cell.

2. The process of claim 1 wherein said waste water with said injected oxygen, air, and catalyst, is fed into a retention tank prior to introduction into said flotation cell.

3. The process of claim 1 wherein said oxygen is added in about the stoichiometric amount necessary to oxidize said sulfide.

4. The process of claim 1 wherein said waste water contains about 55 p.p.m. sulfide and said oxygen is added in an amount of about 0.5 s.c.f.m. per 10,000 barrels of waste water.

5. The process of claim 1 wherein said nickel compound is added to an amount of between about 0.1 to 1.0 p.p.m. of waste water treated.

6. The process of claim 1 wherein said air is injected into said water on the discharge side of said pump.

7. The process of claim 1 wherein said nickel compound is added to said waste water at the discharge side of said pump.

8. The process of claim 1 wherein said nickel compound is added to said waste water at the waste water inlet to said retention tank.

9. A process for removing residual oil and hydrogen sulfide from waste water comprising the steps:
(a) withdrawing said waste water from a container vessel into the suction side of a pump through a suction line,
(b) introducing at least about 0.5 s.c.f.m. of oxygen per 10,000 barrels of waste water into said water through said suction line,
(c) injecting about 1.0 s.c.f.m. of air per 10,000 barrels of water into said water at the discharge side of said pump,
(d) pumping said water to a retention tank through a pump discharge line,
(e) injecting about 0.1 to 1.0 p.p.m. of a soluble nickel compound into said water at the retention tank inlet to effect catalytic oxidation of said sulfide to elemental sulfur,
(f) introducing said water from said retention tank into a flotation cell and releasing the pressure on said water to cause said air to bubble through said water,
(g) removing said oil and sulfur at the water level in said flotation cell.

10. The process of claim 9 wherein said catalyst is added to said water in the retention tank.

References Cited
UNITED STATES PATENTS 3,576,738   4/1971   Duffy _____ 210—44

OTHER REFERENCES

Rohlich, G. A.: Application of Air Flotation To Refineries Waste Waters, Ind. & Eng. Chem., vol. 46, February 1954, pp. 304–308.

MICHAEL ROGERS, Primary Examiner

U.S. Cl. X.R.

210—50, 221